March 12, 1957 — L. C. WASSON — 2,784,913
MODULATING GAS CONTROL APPARATUS
Filed April 19, 1954

INVENTOR.
Loerwood C. Wasson
BY Andrus & Seesles
ATTORNEYS.

United States Patent Office 2,784,913
Patented Mar. 12, 1957

2,784,913

MODULATING GAS CONTROL APPARATUS

Loerwood C. Wasson, Wauwatosa, Wis., assignor to A. O. Smith Corporation, Milwaukee, Wis., a corporation of New York Application April 19, 1954, Serial No. 424,040

7 Claims. (Cl. 236—92)

This invention relates to a gas control apparatus for modulating the flow of gas to a burner.

When using a gas burner in conjunction with a furnace or a hot water heater, it is often desirable to have a modulating gas flow in order to vary the discharge pressure of the gas admitted to the burner in response to the degree of need for heat of the object to be heated. That is, if in a water heater, the temperature of the water decreases slightly due to a small withdrawal of the water and a corresponding introduction of cold water, a low gas pressure is supplied to the burner. If, however, the temperature of water decreases to a greater extent due to the continual withdrawal of water and the corresponding introduction of large quantities of cold water, a high gas pressure is supplied to the burner to reheat the water.

The present invention is directed to a novel gas control apparatus in which the gas pressure to the burner is modulated by connecting the temperature sensitive element which is responsive to the temperature of the object to be heated to the pressure regulating valve. The pressure regulating valve is also positively connected to a pressure sensitive member which is responsive to pressures in the regulating chamber. By this construction a force is exerted on the pressure regulating valve in accordance with temperature decreases of the object to be heated, and the force must be overcome by increased gas pressure within the regulating chamber.

More particularly, the modulating gas control apparatus comprises a casing which defines a gas regulating chamber. A thermostat valve is disposed in the casing and controls the passage of gas from the chamber to the burner. The thermostat valve is actuated by a temperature sensitive element to admit gas to the burner when the temperature of the object to be heated falls below a predetermined temperature.

The entry of gas into the chamber is controlled by a pressure regulating valve which is operated by a pressure sensitive member so that the pressure regulating valve will be opened to admit gas to the chamber when the pressure in the chamber falls below a predetermined limit due to discharge of gas from the chamber to the burner.

According to the present invention, the temperature sensitive element is connected to the pressure regulating valve through a resilient member so that a force is exerted on the pressure regulating valve to open the same when the temperature of the object to be heated decreases to a predetermined value. Due to the resilient connection, the forces exerted on the pressure regulating valve by the temperature sensitive element and the pressure sensitive member are resolved into a resultant force acting on the valve. By this construction the pressure of the gas admitted to the regulating chamber is varied in accordance with the demand for heat with the pressure being greater when the demand for heat is greater.

To permit the gas to be discharged to the burner at a low rate of flow when the demand for heat is small, the modulating force actuated by the temperature sensitive element and acting on the pressure regulating valve is delayed. This delay is accomplished by providing the linkage actuated by the pressure sensitive element with a predetermined amount of play before engaging the valve. In effect the force actuated by the temperature sensitive element and acting on the pressure regulating valve is retarded until the temperature of the object to be heated has fallen below a predetermined limit.

The present invention provides a very simple and inexpensive method of modulating the flow of gas to a burner in response to the degree of heat needed. In addition, the modulating control is retarded and does not take effect until the temperature of the object to be heated falls below a predetermined temperature.

The drawings furnished herewith illustrate the best mode of carrying out the invention as presently contemplated and set forth hereinafter in the drawings.

Figure 2:
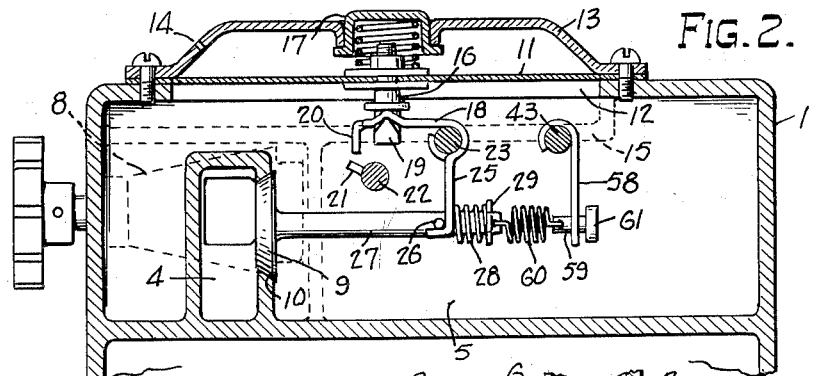
Fig. 2 is a horizontal section taken along line 2—2 of Figure 1.
Figure 1:
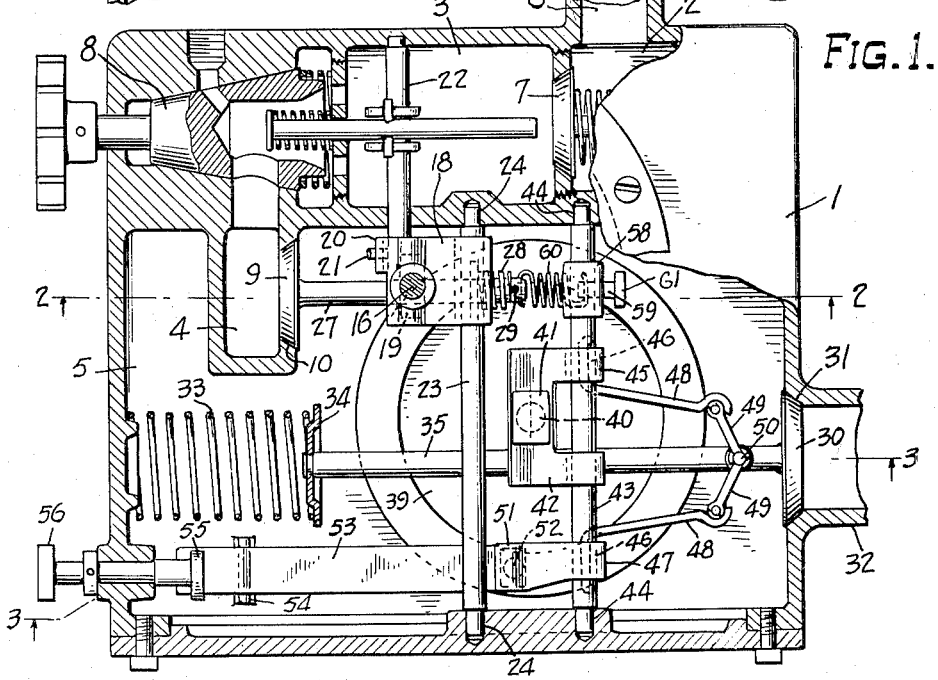
Figure 1 is a vertical sectional view of the gas control apparatus of the present invention.
Figure 3:
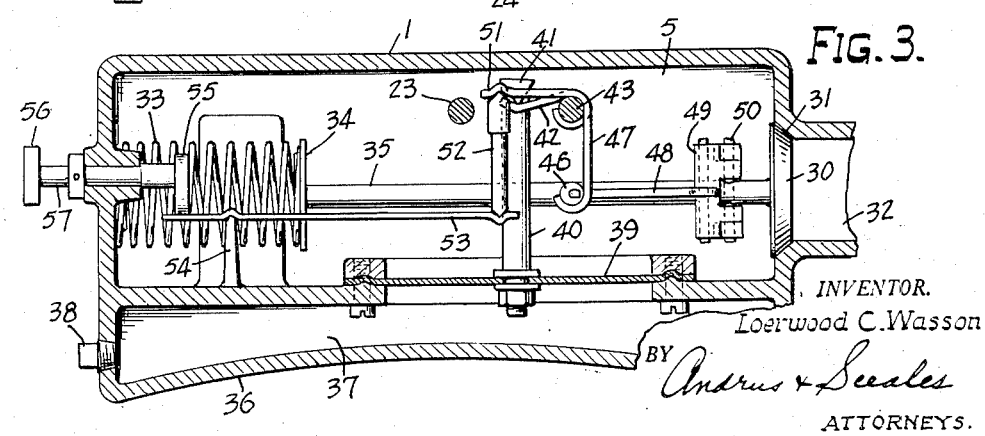
Fig. 3 is a horizontal section taken along line 3—3 of Figure 1.

The drawings illustrate a gas control apparatus for modulating the flow of gas to a burner and comprising a casing 1 which defines an inlet chamber 2, a safety pilot chamber 3, a high pressure chamber 4 and a regulated pressure chamber 5.

Gas from a source, not shown, is introduced into chamber 2 through inlet 6 which is disposed in an opening in casing 1. The flow of gas from chamber 2 to the high pressure chamber 4 is controlled by a safety pilot valve 7 and a gas cock 8 which are disposed between chambers 2 and 3 and between chambers 3 and 4, respectively. The structure and operation of the safety pilot valve, the reset mechanism for the safety pilot valve and the gas cock 8 are old in the art and not part of the invention. Generally, the safety pilot valve 7 operates to shut off the flow of gas into chamber 3 when the pilot light is out, while the reset mechanism serves to manually hold open the safety pilot valve to permit gas to enter the pilot and be ignited at the start of operation.

The safety pilot valve, the reset mechanism and the gas cock are combined in a manner such that the reset mechanism cannot be operated when the gas cock 8 is in "on" or operating position. Instead, the gas cock must be turned to the "pilot" position which permits gas to flow to the pilot but not to the main burner when the reset mechanism is manually actuated to open the safety pilot valve. After the pilot has been ignited and burned long enough to hold the safety pilot valve in the open position, the reset mechanism can be released and the gas cock then rotated to the "on" or operating position.

The flow of gas from the high pressure chamber 4 to the regulating chamber 5 is controlled by a pressure regulating valve 9 which is adapted to seat in a valve seat 10 which is provided by an opening in the casing 1.

The pressure regulating valve 9 is actuated in response to pressure variations in the regulating chamber 5 to admit gas to chamber 5 when the pressure therein falls below a predetermined limit. The pressure sensitive means which operates valve 9 includes a diaphragm 11 which is secured across an opening 12 in casing 1. The outer surface of diaphragm 11 is enclosed by a cover 13 which is secured to casing 1. Atmospheric pressure acting through vent 14 exerts a force against the outer face of the diaphragm 11 while the pressure in chamber 5 exerts a force against the inner face of the diaphragm.

A wall 15 covers chambers 2, 3 and 4 so that the diaphragm is not affected by pressure in these chambers.

Deflections of diaphragm 11 are transmitted to valve 9 by a stem 16 which is secured within an opening in diaphragm 11.

The reset button assembly 17 is disposed around the outer end of stem 16 and bears against the outer face of diaphragm 11. As previously pointed out, the reset mechanism is not to be considered part of the present invention.

Movement of stem 16 serves to pivot an elbow-shaped lever 18 which engages the head 19 of the stem about its supporting shaft.

The free end of lever 18 is bent, as at 20, to contact lug 21 on shaft 22 to rotate the shaft upon inward movement of stem 16. Rotation of the shaft 22 in turn actuates the reset mechanism.

The central portion of lever 18 is secured around the supporting shaft 23 which is journaled within bearings 24 formed in opposite side walls of the portion of casing 1 defining chamber 5 while the inner arm 25 of lever 18 is disposed to engage pin 26 projecting from the valve stem 27 of valve 9. Clockwise rotation of lever 18 results in an engagement of the arm 25 with pin 26 and closes valve 9.

A counterclockwise movement of lever 18 causes the inner end of the arm 25 to engage a spring 28 which is disposed around valve stem 27 and is retained on the stem by a pin 29. The counterclockwise movement of arm 25 acting against spring 28 opens valve 9.

When the pressure in chamber 5 decreases, diaphragm 11 flexes inwardly, thereby pivoting lever 18 counterclockwise to bring arm 25 into engagement with spring 28 to open valve 9. Conversely, when the pressure in chamber 5 increases, diaphragm 11 is forced outwardly and lever 18 and arm 25 are pivoted clockwise. Clockwise pivotal movement of arm 25 effects an engagement of pin 26 to close valve 9.

The passage of gas from the regulating chamber 5 to the burner is controlled by a thermostatic valve 30 which is seated in a valve seat 31 defined by an opening in casing 1. An outlet 32 establishes communication between the valve seat 31 and a gas burner, not shown.

Valve 30 is biased to the closed position by a spring 33 which is interposed between the inner wall of the casing 1 and a disc 34 secured to the end of valve stem 35.

Valve 30 is opened in response to a demand for heat and the opening of valve 30 admits gas from the chamber 5 to the burner. A pressure sensitive mechanism responsive to variations in temperature of the object to be heated controls the operation of valve 30 and includes a housing 36 which may be formed on casing 1 and defines a chamber 37. The housing 36 is adapted to be disposed in immediate contact with the object to be heated or the vessel containing the object to be heated.

Chamber 37 is filled with a liquid having a saturated vapor pressure which changes with variations in temperature. An opening may be provided in housing 36 to introduce and withdraw the liquid. The opening is closed by a removable plug 38.

A diaphragm or bellows 39 is secured across an opening in casing 1 which communicates with the chamber 37. The diaphragm 39 is responsive to variations in vapor pressure of the liquid in chamber 37 and thus is responsive to variations in the temperature of the object to be heated.

If the temperature in the water tank or other object to be heated decreases, the vapor pressure of the liquid in chamber 37 decreases, causing diaphragm 39 to be deflected toward chamber 37. This deflection of diaphragm 39 is transmitted to a stud 40 which is connected to the diaphragm. Inward movement of stud 40 draws head 41 against the free end of a bifurcated lever 42 to pivot the lever counterclockwise. The other or bifurcated end of lever 42 is secured to a shaft 43 which is journaled within bearings 44 formed in opposite side walls of the portion of casing 1 defining chamber 5. Counterclockwise pivotal movement of lever 42 results in a corresponding counterclockwise rotation of shaft 43. The counterclockwise rotation of shaft 43 is transformed into a force to open valve 30. One of the legs 45 of the bifurcated lever 42 is bent around shaft 43 and is connected to one of a pair of bushings 46 while one end of an L-shaped arm 47 on shaft 43 is attached to the other bushing 46. By this construction rotation of shaft 43 results in a generally lateral translation of bushings 46 toward valve 30.

A pair of spring arms 48 are secured to bushings 46. The spring arms are designed so as to follow the rotation of shaft 43 with very little deflection by having a spring action in the direction parallel to the center line of the shaft. The spring arms 48 are each pivotally connected to a toggle arm 49 and the toggle arms 49 are pivotally attached to a pin 50 on valve stem 35. Counterclockwise rotation of shaft 43 causes the spring arms 48 to move toward valve 30 until the pivotal connections between the arms 48 and the corresponding toggle arms 49 pass beyond a transverse plane passing through pin 50. At this point the spring force of arms 48 is greater than the force of spring 33 so that valve 30 snaps open. The valve 30 will remain open as long as the pressure of the liquid in chamber 37 is below a predetermined value.

As the water in the tank increases in temperature, the vapor pressure of the liquid increases moving shaft 40 outward and pivoting lever 42 in a clockwise direction. This pivotal motion causes shaft 43 to be rotated clockwise and the spring arms 48 are drawn away from valve 30, and the valve 30 snaps to the closed position due to the force of spring 33.

To set the equilibrium temperature at which valve 30 opens and closes, an end 51 of arm 47 is notched and engages the head of a pin 52. The opposite end of pin 52 engages a leaf spring 53 which is fulcrumed on pedestal 54. By this linkage, any counterclockwise rotation of shaft 43 is opposed by the force of leaf spring 53. The tension on leaf spring 53 and thus the force exerted by diaphragm 39 necessary to rotate shaft 43 and open valve 30, is varied by cam 55 which engages the outer end of spring 53. The cam is rotated by handle 56 attached to shaft 57 which extends through an opening in the wall of casing 1 to the exterior. Rotation of cam 55 through operation of handle 56 changes the tension on leaf spring 53 and in effect determines the force required to overcome the force of spring 53 and rotate shaft 43 to open valve 30.

To modulate the flow of gas to the burner in accordance with the degree of demand for heat of the object to be heated, an arm 58 is secured to shaft 43. The opposite end of arm 58 straddles a pin 59 which is disposed in axial alignment with the stem 27 of pressure regulating valve 9. The pin 59 is connected to the outer end of stem 27 by an extension spring 60. The arm 58 is disposed out of contact with head 61 of pin 59 so that there normally is a clearance between the arm 58 and head 61.

Counterclockwise rotation of shaft 43 which is brought about by a decrease in temperature in the object to be heated, pivots arm 58 counterclockwise to bring the arm into engagement with head 61 to exert a force acting through spring 60 on valve stem 27 to open valve 9. Thus if the temperature of the object to be heated decreases, the shaft 43 is rotated and the valve 9 is urged to the open position.

The resilient connection between pin 59 and stem 27, as shown by spring 60, enables the forces exerted by arm 25 and arm 58 on valve stem 27 to be resolved into a resultant force acting on the valve 9. Either of these forces can act independently or in combination to effect an opening of valve 9.

The modulating effect actuated by the temperature sensitive element is delayed, by virtue of the clearance between arm 58 and head 61 of pin 59, until the temperature of the object to be heated has decreased to a predetermined value. The arm 58, when pivoted counterclockwise, must move through this clearance to engage head 61 and thus there is a time delay before the arm 58 acts to exert an opening force on valve 9. On the initial demand for heat the valve 9 is opened only by the force of the pressure sensitive member, illustrated by diaphragm 11, to admit gas at a relatively low pressure to chamber 5 and hence through valve 30 to the burner. The pivotal movement of arm 58 through the clearance prevents the modulating action from taking effect on small demands for heat.

After the burner has been ignited and, if the demand for heat is considerable, the force of arm 58 actuated by the temperature sensitive element augments the force actuated by the diaphragm 11 to open valve 9 to a greater extent and increases the flow of gas into chamber 5. In effect the temperature sensitive element exerts a force on the pressure regulating valve in combination with the force exerted by the diaphragm 11 and this force must be overcome by increased gas pressure within the regulating chamber.

If the demand for heat in the water tank or other object to be heated is small, the modulating effect of the temperature sensitive element does not function, for the arm 58 will merely pivot within the clearance without engaging the head 61. Thus for a small demand for heat the valve 9 is actuated only by the diaphragm 11.

To operate the present apparatus the safety pilot valve 7 is held in the open position through manual operation of the reset mechanism and after the pilot is lit the gas cock 8 is turned to the "on" position to permit gas to pass freely from inlet 6 through chambers 2 and 3 to high pressure chamber 4. If the temperature of the water or other object to be heated decreases, the vapor pressure of liquid in chamber 37 correspondingly decreases causing a downward deflection of diaphragm 39. This deflection acting through stud 40 and lever 42 rotates shaft 43 in a counterclockwise direction. A sufficient counterclockwise rotation of shaft 43 moves the spring arms 48 outwardly to open valve 30 to admit gas from chamber 5 to the burner.

As the gas passes from chamber 5 to the burner the pressure in the chamber 5 is decreased thereby causing diaphragm 11 to be deflected downwardly. The downward deflection of diaphragm 11 results in a counterclockwise pivotal movement of arm 25 which engages spring 28 on valve stem 27 to open valve 9 and equalize the pressure in chambers 4 and 5. The rotation of shaft 43 also causes a simultaneous pivotal movement of arm 58 and, if the demand for heat is great enough, arm 58 will engage head 61 of pin 59 to act in combination with the force of arm 25 to open valve 9 to a greater extent and increase the flow of gas into the regulating chamber 5.

As the water in the tank is heated, the vapor pressure in chamber 37 increases and this causes a corresponding counter or clockwise rotation of shaft 43 which reduces the force exerted by arm 58 on valve stem 27 and thereby decreases the modulating effect on the valve 9.

Continued heating of the water will result in a decrease in the force exerted by arm 58 on valve 9 until the arm 58 is pivoted out of engagement with head 61.

When the water or other object to be heated reaches a predetermined temperature determined by the setting on leaf spring 53, the rotational force of shaft 43 acting on spring arms 48 will be insufficient to overcome the force of spring 33 on valve 30, and valve 30 will then close to prevent the discharge of gas from chamber 5 to the burner.

With the valve 30 closed, the pressure in chamber 5 will then increase and diaphragm 11 will be forced outwardly until the pressure in chambers 4 and 5 is balanced and this equilibrium will cause valve 9 to be closed by the action of arm 25 engaging pin 26.

The present invention provides a simple and inexpensive apparatus for modulating or controlling the rate of flow of gas to a burner in accordance with the demand for heat in the object to be heated. The modulating effect is delayed until the temperature of the object to be heated has fallen below a predetermined temperature, and then the modulating action takes effect to increase the flow of gas to the burner in proportion to the demand for heat in the object to be heated.

While the above description of the invention is directed to the use of the apparatus in combination with a water heater or the like in which the temperature sensitive means is responsive to the temperature of the water within the tank, it is contemplated that the apparatus may be used with any type of heating system and the temperature sensitive means may be responsive to temperature variations in any object, such as a material to be heated, a confined space or the atmosphere, depending on the heating system employed.

Various modes of carrying out the invention are contemplated as within the scope of the following claims particularly pointing out and distinctly claiming the subject matter which is regarded as the invention.

I claim:

1. A modulating gas control apparatus for regulating the flow of gas to a burner, comprising a casing defining a gas chamber, temperature sensitive means disposed externally of the casing and responsive to the temperature variations in an object, valve means actuated by the temperature sensitive means to control the discharge of gas from the chamber to a gas burner in accordance with temperature decreases of said object, second valve means to control the entry of gas into said chamber, pressure sensitive means connected to said second valve means and responsive to pressure variations in said chamber to actuate said second valve means and admit gas to the chamber in accordance with pressure decreases in said chamber, and means separate from said pressure sensitive means and actuated by the temperature sensitive means and acting on said second valve means to open the same after the temperature of the object has fallen below a predetermined limit.

2. A modulating gas control apparatus for regulating the pressure of gas discharged to a burner, comprising a casing defining a gas chamber, temperature sensitive means disposed externally of the casing and responsive to the temperature of an object to be heated, valve means actuated by the temperature sensitive means to control the discharge of gas from the chamber to a gas burner in accordance with decreases in temperature of said object, second valve means to control the entry of gas into said chamber, pressure sensitive means connected to said second valve means and responsive to pressure variations in said chamber to open said second valve means and admit gas to the chamber in accordance with decreases in pressure in said chamber, a resilient member connected to said second valve means, and means actuated by the temperature sensitive means and acting on said resilient member to exert a force in a direction to open said second valve means after the temperature of the object has fallen below a predetermined temperature, said force being generally proportional to the differential in temperature between said object and said predetermined temperature.

3. A modulating gas control apparatus for regulating the flow of gas to a burner in proportion to the demand for heat comprising a casing defining a gas chamber, temperature sensitive means responsive to the temperature variations in an object, valve means disposed in the casing and actuated by the temperature sensitive means to control the discharge of gas from the chamber to a gas burner in accordance with decreases in temperature of said object below a predetermined temperature, second valve means disposed in the casing to control the entry of gas to said chamber, pressure sensitive means connected to said second valve means and responsive to pressure decreases in said chamber to open said second valve means and admit gas to the chamber in accordance with pressure decreases in said chamber, a resilient member connected to said second valve means, connecting means actuated by the temperature sensitive means and acting on said resilient member to exert a force to open said second valve means, and means for delaying the action of said connecting means until the temperature of said object has decreased a given amount below said predetermined temperature.

4. A modulating gas control apparatus for regulating the flow of gas to a burner in proportion to the demand for heat, comprising a casing defining a gas chamber, temperature sensitive means responsive to the temperature of an object to be heated, valve means disposed in the casing and actuated by the temperature sensitive means to control the discharge of gas from the chamber to a gas burner in accordance with decreases in temperature of said object, second valve means disposed in the casing to control the entry of gas to said chamber, pressure sensitive means connected to said second valve means and responsive to pressure decreases in said chamber to exert a force on said second valve means and admit gas to the chamber in accordance with pressure decreases in said chamber, means actuated by the temperature sensitive means for exerting a second force on said second valve means in combination with said first force, said second force being generally proportional to the temperature decrease of said object and to be overcome by increased gas pressure within said chamber, and means for retarding the action of the second named force until after the gas in the burner has been ignited.

5. A modulating gas control apparatus for regulating the flow of gas to a burner in proportion to the demand for heat, comprising a hollow casing defining a gas chamber, temperature sensitive means responsive to the temperature of an object to be heated, a shaft rotatably mounted within the gas chamber and connected to said temperature sensitive means with the temperature differential between the temperature of the object and a predetermined temperature producing a corresponding rotation of said shaft, valve means disposed in the casing for controlling the discharge of gas from the chamber to a gas burner, said valve means being connected to the shaft and actuated by rotation of said shaft to admit gas to the burner in accordance with said temperature differential, second valve means disposed in the casing to control the entry of gas into said chamber, pressure sensitive means connected to said second valve means and responsive to pressure variations in said chamber for opening said second valve means to admit gas to said chamber in accordance with pressure decreases in said chamber, and connecting means interconnecting the shaft and said second valve means for opening said second valve means in combination with said pressure sensitive means after the temperature of said object has decreased to a predetermined value to effect a rate of gas flow into said chamber in proportion to said temperature differential.

6. A modulating gas control apparatus for regulating the flow of gas to a burner in proportion to the demand for heat, comprising a casing defining a gas chamber, temperature sensitive means responsive to the temperature of an object to be heated, a shaft rotatably mounted within the gas chamber and connected to said temperature sensitive means with the temperature differential between the temperature of the object and a predetermined temperature producing a corresponding rotation of said shaft, valve means disposed in the casing for controlling the discharge of gas from the chamber to a gas burner, said valve means being connected to the shaft and actuated by rotation of said shaft to admit gas to the burner in accordance with said temperature differential, second valve means disposed in the casing to control the entry of gas into said chamber, pressure sensitive means connected to said second valve means and responsive to pressure variations in said chamber for opening said second valve means to admit gas to said chamber in accordance with pressure decreases in said chamber, a contact member resiliently connected to the second valve means, an arm connected to said shaft and spaced normally out of contact with said contact member to provide a clearance therebetween, said arm adapted to pivot about said shaft and through said clearance in accordance with rotation of said shaft to engage said contact member and open said second valve means in combination with said pressure sensitive means, said clearance being of sufficient magnitude to retard the engagement of the arm with said contact member until after the temperature of said object has decreased to a predetermined value.

7. In a modulating gas control apparatus for regulating the flow of gas to a burner in proportion to the demand for heat, a casing defining a gas chamber disposed in communication with a gas burner, temperature sensitive means responsive to the temperature of an object to be heated, a shaft rotatably mounted within the gas chamber and connected to said temperature sensitive means with the temperature differential between the temperature of the object and a predetermined temperature producing a corresponding rotation of said shaft, valve means disposed in the casing to control the entry of gas into said chamber, a diaphragm connected to said valve means and responsive to variations in pressure in said chamber for exerting a force to open said valve means in accordance with pressure decreases in said chamber from a predetermined pressure, a resilient member connected to said valve means, a contact member connected to said resilient member, an arm connected to said shaft and spaced normally out of contact with said contact member to provide a clearance therebetween, said arm adapted to pivot about said shaft and through said clearance in accordance with rotation of said shaft to engage said contact member and open said valve means in combination with said pressure sensitive means, said clearance being of sufficient magnitude to delay the engagement of the arm with said contact member until after the temperature of said object has decreased to a predetermined value.

References Cited in the file of this patent

UNITED STATES PATENTS

| | | |
|---|---|---|
| 1,796,544 | Shivers | Mar. 14, 1931 |
| 1,909,495 | Mancib | May 16, 1933 |
| 2,164,511 | Furlong | July 4, 1939 |
| 2,212,285 | Ayers | Aug. 30, 1940 |